June 23, 1970  J. S. NOSS  3,516,434

LOCK TYPE EXCESS FLOW VALVE

Filed Aug. 9, 1968

INVENTOR
JEFFREY S. NOSS
BY
MCNENNY, FARRINGTON, PEARNE, & GORDON
ATTORNEYS

United States Patent Office 3,516,434
Patented June 23, 1970

3,516,434
LOCK TYPE EXCESS FLOW VALVE
Jeffrey S. Noss, South Euclid, Ohio, assignor to Textron Inc., Providence, R.I., a corporation of Delaware
Filed Aug. 9, 1968, Ser. No. 751,508
Int. Cl. F16k 21/06
U.S. Cl. 137—514.5
13 Claims

ABSTRACT OF THE DISCLOSURE

A combination liquid eduction valve and excess flow check valve, including a body having a bore therethrough and a valve seat adjacent one end of the bore. A poppet is adapted to make sealing engagement with the valve seat, and a valve stem located in the body bore is slidably carried by a bore through the poppet. A stop member is secured on the outer end of the valve stem to make sealing engagement with the poppet to prevent fluid leakage through the poppet bore. A helical spring urges the stop member into sealing engagement with the poppet and the poppet into sealing engagement with the valve seat. Another helical spring carried by the stem urges the poppet against the stop. The stop member forms a closed-end cylinder within which the poppet moves as a piston to form a dashpot to dampen oscillations of the poppet along the stem.

CROSS-REFERENCES TO RELATED APPLICATION

Figure 1:
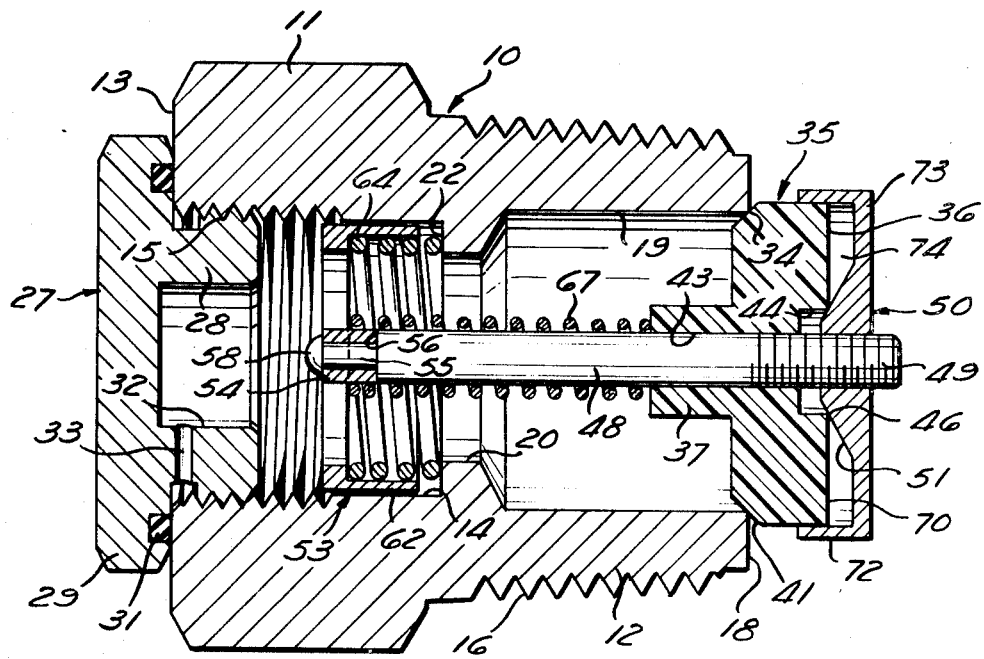

This application relates to an improvement which may be used in conjunction with the invention disclosed in the Courtot et al. application, Ser. No. 523,309, filed Jan. 27, 1966, now Pat. No. 3,469,605.

BACKGROUND OF THE INVENTION

This invention relates generally to valves, and more particularly to a combination liquid eduction valve and excess flow check valve used particularly for liquid filling and liquid eduction in liquefied petroleum gas tanks.

Valves of this type are used principally for the eduction or drawing off of the liquefied gases from central storage tanks for recharging and refilling smaller containers, and for filling central storage tanks. Such valves are generally located to allow them to draw off the liquid in the tank rather than the gas above the liquid level. Such valves are arranged to be normally closed and to be opened when a suitable fitting is attached to the valve for either filling or reduction purposes.

During eduction, the valve is arranged to operate as an excess flow check valve so that in the event of an abnormally high eduction rate such as might attend a break in the discharge line, the sudden increase in flow rate will cause the valve to close to prevent further leakage. After closure because of excess flow, a slight makeup or leakage flow permits pressure equalization after the structure has been repaired or turned off so that the valve will then automatically reopen. Structurally, such valves are provided generally with a poppet member to substantially close the valve, and a stop member which both acts to limit the opening movement of the poppet and also to terminate the leakage or make-up flow when the unit operates as a check valve. When a fitting or eduction purposes is attached to the valve, the stop member is displaced from the poppet to permit the leakage flow when the poppet is closed to equalize the fluid pressure on both sides of the poppet so that the poppet can open to permit fluid flow through the valve.

With the poppet thus opened to permit liquid eduction from the central storage tank, the poppet is free to be axially displaced back to its closed position by an increased pressure differential thereacross resulting from an excess flow condition. However, it has been found that the poppet may tend to oscillate axially toward and away from its closed position with transient fluid pressure pulsations which are not indicative of an excess fluid flow condition. These transient pressure pulsations may be caused by opening and closing of valves downstream of the excess flow check valve to fill the smaller containers, or by any of numerous other fluidic phenomena. Such instability of the poppet causes the fluid flow rate through the valve to vary and may also cause chattering in the system.

SUMMARY OF THE INVENTION

The present invention overcomes these and other difficulties of the prior art valves by providing a novel and improved damping means which performs as a dashpot to dampen any oscillations of the poppet. The damping device according to the principles of this invention includes a means to substantially isolate one radial end face of the poppet from free exposure to the fluid pressure thereabout, and a calibrated metering orifice to control the application of fluid pressure to that substantially isolated end face of the poppet.

According to the preferred embodiment, the stop member includes a radial end portion and an axially extending skirt portion forming a closed end cylinder within which the poppet moves as a piston to define an expensible fluid chamber. The annular clearance between the skirt portion and the poppet forms a calibrated metering orifice through which fluid must flow to permit the poppet to move toward or away from the valve seat to close or open the valve respectively. This prevents the poppet from oscillating in response to transient pressure pulsations, and permits it to close the valve only when the pressure differential across the poppet exists for a prolonged period of time.

The damping means as provided by this specific embodiment of the invention is of extremely simple and rugged construction. The metering orifice, being ring-shaped rather than cylindrical, will not become clogged by dirt, lint or other foreign material. Additionally, the damping means does not require any additional parts, since it employs the existing poppet and stop member to form the damping means. Furthermore, the incorporation of the invention into present production valves will require only minor changes in these two parts and will not necessitate any change in assembly procedure or increase in assembly time.

DESCRIPTION OF THE PREFERRED EMBODIMENT

Figure 2:
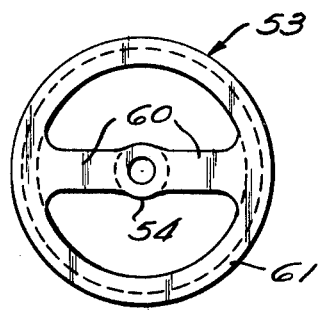

These and other objects and advantages of the invention will become more readily apparent to those skilled in the art upon a full and comprehensive understanding of the preferred embodiment of this invention as shown in the accompanying drawings, wherein:

FIG. 1 is a longitudinal, cross-sectional view of a valve according to the preferred embodiment of the invention, and FIG. 2 is a fragmentary view of the spring retainer taken on line 2—2 of FIG. 1.

Referring now to the figures in greater detail, the valve includes a body 10 of a suitable material such as brass or steel having an enlarged wrench-receiving portion 11 at one end and a reduced diameter shank portion 12 at the other end. The wrench-receiving portion 11 terminates in a flat, annular end face 13 from which the end bore 14 extends into the body 11. At its outer end, the bore 14 is provided with internal threads 15 for receiving either a valve, fitting or sealing plug. The shank portion 12 is provided with an externally threaded end portion 16 terminating in a radially planar end face 18, from which the end bore 19 extends into the body 11. Preferably, the threads 16 are of the tapered pipe thread type for sealing purposes. A reduced diameter passage 20 establishes fluid communication between the end bores 14 and 19, and the juncture of said passage 20 and end bore 14 defines a body shoulder 22.

A plug 27 may be inserted within the bore 14 to seal off the valve, and for this purpose, plug 27 has a threaded shank portion 28 adapted to fit into the threaded portion 15 of the bore 14. As shown, the plug 27 has an enlarged, radially extending head 29 which carries an annular sealing ring 31 adapted to make sealing engagement with the body end face 13. The plug 27 also has a blind axial bore 32 therein which communicates through a radial passage 33 to the space adjacent the seal 31. This provides for fluid pressure balance within the plug to insure that when the plug is in place, the seal takes place at the sealing ring 31 so that when the plug is loosened, any fluid pressure which has accumulated within the valve will be released as soon as the sealing ring 31 moves away from the end face 13 while the threads still hold the plug in engagement with the valve.

The end bore 19 at the end face 18 forms a valve seat portion 34 which may be either sharp or convexly radiused. To close the valve, the bore 19 is closed off at the inner or downstream end at end face 18 and valve seat portion 34 by means of a poppet 35 which has a head portion 36 extending outwardly of the body 10 and a stem portion 37 fitting within the bore 19.

The stem portion 37 has a cylindrical diameter substantially less than that of the bore 19 so as to allow free flow of fluid through the valve when the poppet 35 is opened. To insure positive sealing and to eliminate the need for guide members which may impose a flow restriction, the head 36 has a self-aligning, conical sealing surface 41 which makes sealing engagement with the valve seat 34. To improve its sealing properties and to reduce its reciprocating mass, the poppet 35 is preferably made of a plastic material, such as nylon, acetal, or polytetrafluorethylene, but it can also be made of metal if desired.

The poppet 35 has an axially extending bore 43 which opens into a counterbore 44 at its outer end. The outer edge of the counterbore 44 forms a valve seat 46 for purposes of sealing the bore 43 when the valve is in the closed position. An elongated, generally cylindrical valve stem 48 is carried with a loose, sliding fit in the poppet bore 43 and extends through the valve body 10 to a point adjacent the internal threaded portion 15. At the end adjacent to the poppet 35, the stem 48 is provided with threads 49 to permit a stop or valve member 50 to be secured thereto at any desired position along the stem 48. This permits the excess flow rate at which closure occurs to be adjusted, as will be described in greater detail hereinafter. After the stop member 50 has been assembled in place, it is preferably secured by staking or upsetting of the threaded stem end 49. A conical surface 51 is carried by the stop member 50 and is adapted to make sealing contact with the poppet valve seat 46 so as to seal against fluid flow past the stem through the bore 43 when the valve is closed.

At the other end of the stem 48 is mounted a retainer 53 which has a hub 54 adapted to fit on a reduced diameter end 55 of stem 48 against a shoulder 56. The retainer is held in place by means of a spun or upset head 58 formed on the reduced end 55. The retainer 53 has a pair of radial spokes 60 which join the hub 54 with the annular rim 61, which has an axially extending skirt 62 to receive and position one end of a relatively heavy helical spring 64 whose other end abuts against the body shoulder 22. The skirt 62 also serves as a further stem guide to eliminate the need for flow-restricting stem guide members in the valve. The radial spokes 60 further serve as one abutment for a light helical spring 67 whose other end abuts against the poppet 35.

In use, the valve is mounted in the high pressure storage tank (not shown) with the threaded shank portion 12 received in a threaded boss so that the inner end face 18 is exposed to fluid under pressure. Under these conditions, the valve will assume the configuration shown in FIG. 1 in which the spring 64 serves to urge the retainer 53, and hence stem 48 toward the left so that the stop member 50 holds the poppet 35 firmly in sealing engagement with the valve seat 34. Because of the sealing between the self-aligning sealing surface 41 on poppet 35 against the valve seat 34, and the sealing between the conical surface 51 of stop member 50 against the valve seat 46, the valve is effectively sealed against the escape of any fluid pressure from the interior of the storage tank.

When the valve is to be opened, the plug 27 is removed and a valve assembly (not shown) is threaded into the end bore 14 and arranged to make sealing engagement with the valve. When this is done, the shank portion of the valve being inserted engages the retainer 53 to urge the retainer 53 and stem 48 toward the right against the bias of spring 64. This movement of the stem 48 moves the stop member 50 away from the poppet and the spring 67 now forces the poppet 35 away from the valve seat 34 by holding it in contact with the stop member 50 so as to open the valve. When the poppet is opened, the bore 19 is relatively unobstructed to permit a relatively high rate of flow, since there are no obstructions such as spiders or guides for the stem 48 which would cause restrictions and turbulence to flow through the valve.

When the poppet is in the open position, it also acts as an excess flow check valve in the event that a downstream line should be ruptured. In such case, the rate of flow through the valve increases above the normal eduction rate because of the lack of any back pressure, and this increase flow past the poppet 35 causes an increased pressure differential to appear across the poppet 35 and produces a force tending to urge the poppet 35 into engagement with its valve seat 34. In such case, this biasing force on the poppet 35 overcomes the force of spring 67 and the poppet slides along stem 48 into sealing position against valve seat 34. Since the excess flow rate at which closure occurs is determined by the pressure drop across the poppet, and hence the size of the opening between the poppet 35 and the seat 34, this closure flow rate can be adjusted by screwing the stop member 50 along the threaded portion 49 of the stem 48.

If the inner or downstream end face 70 were freely exposed to the high pressure fluid from the storage tank, the poppet 35 would tend to oscillate axially along the stem 48 with transient fluid pressure pulsations, such as might be caused by any of numerous fluidic phenomena or even by opening and closing the filling valve downstream of the excess flow check valve to fill the smaller containers. For these and other reasons, the present invention provides a damping means which restricts the axial displacement of the poppet 35 so that it is not responsive to close the valve when the increased pressure drop is only transient, thereby damping out any oscillations which tend to occur.

The foregoing problems and disadvantages are overcome by the present invention which provides a damping action for the movement of the poppet under excess flow conditions. In the preferred embodiment of the valve, an axially extending skirt portion 72 extends from the radial end wall 73 of stop member 50 to form a closed end cylinder within which the poppet 35 moves as a piston to define an expansible fluid chamber 74. The annular clearance between the skirt portion 72 and the outer periphery of the poppet 35 establishes a calibrated metering orifice through which fluid must flow to and from the expansible chamber 74 to permit the poppet 35 to slide along the stem 48 away from the stop member 50 to open or close the valve. This effectively isolates the inner or downstream end face 70 of poppet 35 from free communication with the high pressure fluid from the central storage tank so that the end face 70 will not be freely exposed to the transient fluid pressure pulsations and will not oscillate along the stem 48.

Under excess flow check valve action when the poppet 35 is in its closed position and the stop member 50 is held away by the position of the stem 48, a calibrated leakage is provided by means of the clearance between the poppet bore 43 and the stem 48. The fit at this point is made relatively loose to insure that there will be a pressure bleed which is quite small compared to the flow capacity of the valve. This is done because after closure or repair of the ruptured downstream line, it is necessary for the poppet 35 to reopen, and this controlled bleed then allows for equalization of pressure on both sides of the poppet 35. Thus, after the downstream line has been closed off, the pressure on both sides of the poppet 35 is equalized, and the spring 67 forces the poppet 35 again to the open position in engagement with the stop member 50.

When the fitting is removed from the end bore 14, the spring 64 will move the retainer 53 toward the left so that the stop member 50 shifts the poppet 35 into engagement with the valve seat and the valve is then closed. Because the spring 67 which biases the poppet 35 to the opened position abuts on the retainer 53, rather than on a member fixed to the body 10, the calibration of the excess flow check valve operation of the poppet 35 is relatively independent of the operation of the spring 64.

Likewise, because the distance of movement of the poppet 35 to the open position is small, and since the effective valve opening area between the valve seat 34 and the sealing surface 41 is much less than the effective passage area of the bore 19, most of the effective pressure drop takes place across the poppet between the storage tank and the bore 19. In addition, because the opening movement of the valve stem 48 is limited to a maximum by the engagement of the skirt 62 with the shoulder 22, the opening movement or valve lift of the poppet 35 can be adjusted by the threaded adjustment of the stop member 50 on the threaded portion 49. Thus, this movement of the stop member 50 can be used to adjust the rate of excess flow at which the poppet closes, and such adjustment remains independent of the pressure within the storage tank since the end wall 73 of stop member 50 prevents fluid flow from impinging directly on the poppet.

Although the preferred embodiment of the invention has been shown and described in detail herein, it is recognized that various modifications and rearrangements will readily become apparent to those skilled in the art upon a full and comprehensive understanding of this invention and may be resorted to without departing from the scope of the invention as defined in the following claims.

What I claim is:

1. A valve comprising a body having a bore therethrough, a valve seat in said bore, a poppet adapted to make sealing engagement with said valve seat, a valve stem slidably carried by said poppet, a stop member carried by said valve stem outward of said poppet, a first spring means operable to bias said poppet against said stop member, a second spring means operable to bias said valve stem and said stop member in a direction to urge said poppet against valve seat, and a damping means carried by said valve stem operable to dampen oscillation of said poppet along said stem.

2. A valve as set forth in claim 1, wherein said damping means includes a closed-end cylinder, piston means carried by said poppet and slidably disposed within said closed-end cylinder to define an expansible fluid chamber therein, and a calibrated metering orifice operable to admit fluid pressure to said expansible fluid chamber at a controlled rate.

3. A valve as set forth in claim 2, wherein said closed-end cylinder is said stop member.

4. A valve as set forth in claim 2, wherein said piston means is said poppet and said calibrated metering orifice is operable to admit fluid pressure to the radial end face of said poppet at a controlled rate.

5. A valve as set forth in claim 4, wherein said closed-end cylinder is formed by said stop member, and said calibrated metering orifice is defined by the annular clearance between said closed-end cylinder and the outer periphery of said poppet.

6. A valve comprising a body having a bore therethrough, a valve seat at one end of said bore, a poppet adapted to make sealing engagement with said valve seat, said poppet having an axial bore therethrough, a valve stem located within said body bore and slidably carried by said poppet bore, said poppet bore being slightly larger in diameter than said valve stem to allow a leakage passage through said poppet, said poppet having a poppet valve seat around said poppet bore away from said body, a stop on said valve stem outward of said poppet, said stop having a valving surface adapted to make sealing contact with said poppet valve seat, first spring means operable to bias said poppet against said stop, a second spring means operable to bias said valve stem and said stop in a direction to urge said poppet against said valve seat, and a damping means operable to dampen oscillation of said poppet along said stem.

7. A valve as set forth in claim 6, wherein said damping means includes a closed-end cylinder, piston means carried by said poppet and slidably disposed within said closed-end cylinder to define an expansible fluid chamber therein, and a calibrated metering orifice operable to admit fluid pressure to said expansible fluid chamber at a controlled rate.

8. A valve as set forth in claim 7, wherein said closed-end cylinder is formed by a radial end wall and an axially extending skirt portion of said stop member, and said piston means is said poppet so that said calibrated metering orifice is operable to admit fluid pressure to the radial end face of said poppet at said controlled rate.

9. A valve as set forth in claim 8, wherein said calibrated metering orifice is formed by the annular clearance between said skirt portion and the outer periphery of said poppet.

10. A valve adapted to be secured to a fluid pressure tank for filling and education purposes, said valve comprising a body having an end face exposed to the fluid pressure in said tank, a bore extending through said body from said end face, a valve seat in said bore adjacent said end face, a poppet adapted to make sealing engagement with said valve seat, said poppet having an outer end face away from said valve seat, a valve stem slidably carried by said poppet and movably mounted in said bore, a stop member carried by said valve stem outward of said poppet, spring means operable to bias said poppet against said stop member, and means carried by said valve stem operable to substantially isolate said outer end face of said poppet from said fluid pressure in said tank when said poppet is spaced away from said valve seat.

11. A valve as set forth in claim 10 wherein said last mentioned means is said stop member.

12. A valve as set forth in claim 11 wherein said stop member includes a closed-end cylinder within which said poppet is slidably disposed.

13. A valve comprising a body having an end face, a bore extending through said body from said end face, a valve seat at the junction of said end face and one end of said bore, a shoulder in said bore, a poppet having a stem portion within said bore, and a head portion adapted to make sealing engagement with said valve seat, an axial bore through said poppet, a valve stem loosely slidably carried in said poppet bore, a stop member secured on the one end of said valve stem outward of said poppet, said stop member having a sealing surface adapted to make sealing engagement with said poppet to prevent fluid leakage through said poppet bore, an enlarged retainer member secured to the other end of said stem and operable upon insertion of an element into the other end of said bore to shift said valve stem in a direction to move said stop member away from said end face, a first helical spring carried by said stem and abutting at one end against said retainer, the other end of said first spring engaging said poppet to bias said poppet against said stop member, a second helical spring within said bore abutting at one end against said shoulder and at the other end against said retainer member to bias said valve stem and said stop in a direction to urge said stop into sealing engagement with said poppet and said poppet into sealing engagement against said valve seat, and a damping means operable to dampen oscillation of said poppet along said stem; said damping means including a closed-end cylinder formed by a radial end wall and an axially extending skirt portion of said stop member, said poppet being slidably disposed in said closed-end cylinder and cooperating with said closed-end cylinder to define an expansible fluid chamber, and a calibrated metering orifice defined by the annular clearance between said skirt portion and the outer periphery of said poppet so that said calibrated metering orifice is operable to admit fluid pressure to the radial end face of said poppet at a controlled rate to dampen oscillation of said poppet along said stem in response to transient fluid pressure pulsations.

References Cited
UNITED STATES PATENTS 3,469,605   9/1969   Courtot _____ 137—630

ALAN COHAN, Primary Examiner

H. COHN, Assistant Examiner

U.S. Cl. X.R.

137—517, 630